Jan. 23, 1945.  V. GREY  2,367,863

CENTRIFUGAL CHUCK

Filed March 26, 1943

INVENTOR
VICTOR GREY
BY
*H. B. Whitfield*
ATTORNEY

Patented Jan. 23, 1945

2,367,863

UNITED STATES PATENT OFFICE 2,367,863

CENTRIFUGAL CHUCK

Victor Grey, Chicago, Ill., assignor to Teletype Corporation, Chicago, Ill., a corporation of Delaware Application March 26, 1943, Serial No. 480,665

6 Claims. (Cl. 279—50)

This invention relates to devices for holding parts during processing and more particularly to centrifugal chucks.

It is often necessary in the manufacture of small parts such as screws, bushings, etc., to perform what is known as "second operations" thereon, such as polishing and surface finishing. Because of the short duration of the operation considerable fatigue is introduced where the work is gripped by a collet which is actuated manually. As the normal daily output of an operator may average several thousand, this means that the operator must perform the normal operations a corresponding number of times. To eliminate this fatigue element, centrifugal chucks are used.

An object of the invention is the provision of a centrifugal chuck which is simple and which is designed to expedite and facilitate operations while eliminating fatigue.

Another object of the invention is to provide an automatic chuck including a holding member which operates by centrifugal force to hold positively a piece part either by the action of compression or expansion.

The above and other objects of the invention are attained by the provision of a device composed of a housing secured to a driven shaft within which is a laterally movable element and several centrifugal plungers. The plungers are radially balanced and are arranged in such a manner so that upon rotation of the shaft and housing the plungers will cause lateral movement of the movable element. The lateral movement of the movable element causes a plurality of segments to grip and hold the piece part positively. When the operations on the part have been performed, the power to the shaft is removed with the result that the segments disengage the part.

A more detailed understanding of the invention may be had from the following description with reference to the accompanying drawing in which.

Figure 1:
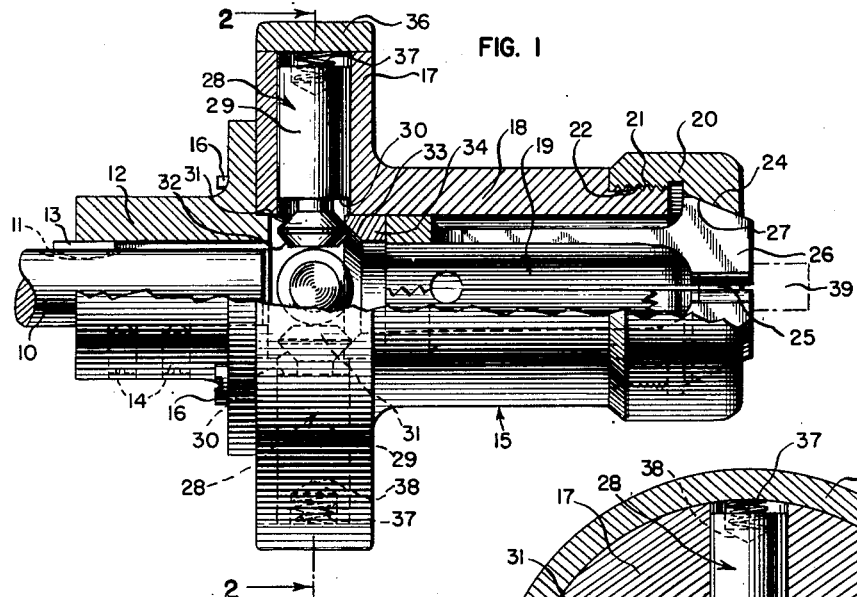
Fig. 1 is a side elevational view, partly in section, of a device embodying the invention.
Figure 2:
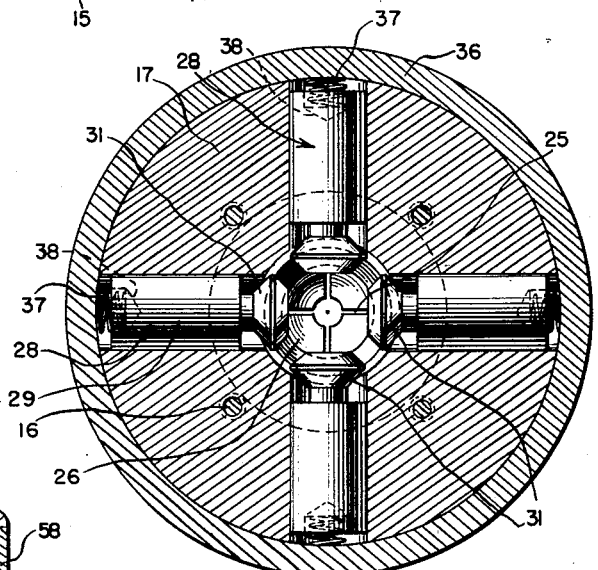
Fig. 2 is a cross-sectional view taken on line 2—2 of Fig. 1, looking in the direction of the arrows.

While no driving means has been shown such a chuck is usually driven by an electric motor. A high torque motor is preferable, so that its working speed may be attained under rapid acceleration when set in operation by the operator. A magnetic brake is also used, so that when the operator desires to stop rotation of the motor, the working spindle will come to an immediate stop rather than overrun, which would compel the operator to wait out the time for the chuck (and the piece part) to come to rest.

A rotary shaft 10 having a keyway 11 therein is driven by a motor (not shown). The shaft 10 may be an extension of the motor armature, or any driving connection known to the art may be used. A flanged collar 12 is secured to the shaft 10 by means of a key 13 engaging the keyway 11 with set screws 14 securing the flanged collar against longitudinal movement. A housing, generally designated as 15 and secured to the flanged collar 12 by means of bolts 16, comprises radial chambers 17 and a laterally extending chamber 18. A collet 19 extends within the laterally extending chamber 18, and is secured therein by means of a retainer nut 20 which has a conical bore 24 and a threaded portion 21 that engages a threaded portion 22 of the laterally extending chamber 18. The collet 19 is of a conventional design having slots 25 therein dividing the jaw portions 26 into equal angular segments. The collet jaw 26 has a conical outer wall 27 which engages the conical bore 24 of the retainer nut 20.

Within the radial chambers 17 are placed centrifugal plungers 28, one in each chamber, which are formed of a cylindrical body portion 29 having a shoulder 30 and a frusto-conical head 31 which has a cam surface 32 that engages a chamfered surface 33 of a thrust ring 34. The thrust ring 34 is interposed between the heads 31 of the centrifugal plungers 28 and the inner end of the collet 19. Surrounding the radial chambers 17 is a cover ring 36 which retains the centrifugal plungers 28 within the radial chambers 17 and limits their radial movement resulting from centrifugal action when the shaft and housing are rotated. Interposed between the centrifugal plungers 28 and the cover ring 36 are springs 37 which may be nested within recesses 38 in the centrifugal plungers 28. Piece parts 39 are placed within the jaw 26 of the collet 19.

The operation of the device is as follows:

The shaft 10 is started into rotation and as the housing 15 is rotated the centrifugal plungers 28, because of their weight and of centrifugal force, will tend to move radially, compressing the spring 37, which together with the cover ring 36, acts as a limit to the extent of the radial movement of the centrifugal plungers 28. The radial chambers 17 are of such length that there will be a clearance between the plungers 28 and the cover ring 36 at the point of maximum radial movement of the plungers.

As the centrifugal plungers 28 thrust radially outward their cam surface 32, on the frusto-conical head 31, cams the thrust ring 34 to the right as seen in Fig. 1. Since the thrust ring 34 normally abuts the end of the collet 19 any movement of the thrust ring will be transmitted to the collet. Any movement of the collet 19 toward the right, as viewed in Fig. 1, will cause the conical wall 27 of the collet jaw 26 to engage the conical bore 24 of the retainer nut 20 which is screwed onto the housing 15 and is therefore stationary. Therefore, any movement will have to be taken up by the collet jaw 26, which is possible because the jaw 26 of the collet is divided into equal segments by the slots 25. It is thus possible for these segments to be compressed, decreasing the size of the slots 25 and so increasing the pressure being exerted by the segments upon the piece part 39. This tends to hold the piece part in a positive manner so that work can be performed thereon.

Upon further radial movement of the centrifugal plungers in the chambers 17, due to rotation of the shaft and housing, a greater pressure will be exerted, through the cam surface 32 of the frusto-conical heads 31, upon the thrust ring 34. The pressure applied on the thrust ring 34 increases the pressure upon the collet 19 and through the collet jaw 26 to the piece part 39. Since the radial movement of the centrifugal plungers 28 is limited by the cover ring 36 and the spring 37, it is possible to exert a predetermined amount of pressure upon the piece part 39 held by the collet jaw 26.

By changing the weight of the centrifugal plungers 28 the amount of pressure exerted upon the piece part 39 may be varied. This amount of pressure could also be predetermined by controlling the space between the end of the body portion 29 of the centrifugal plungers 28 and the cover ring 36, or by changing the size or the tension of the spring 37.

Thus, as has been illustrated, this device acts in a positive manner to hold piece parts secured within a collet and upon which certain operations are to be performed. All that is necessary is for the operator to place the piece part 39 within the collet jaw 26 and actuate the electric motor, which through the selected drive causes the shaft 10 to rotate. The weight of the centrifugal plungers 28, together with centrifugal force, will immediately cause them to move radially and thus apply pressure upon the piece part. In this way, it is not necessary for the operator to take time to make any adjustments, tightenings, etc., upon the article upon which the work is to be performed.

After the required operation has been completed the operator causes the magnetic brake to be applied which stops shaft 10 and results in the centrifugal plungers 28 moving to their normal position thus reducing the pressure exerted by the chamfered surface 32 upon the thrust ring 34. The segments of the collet jaw 26, due to their resiliency, will spring outwardly, the conical wall 27 sliding inwardly on the conical bore 24 of the retainer nut 20, which results in the collet 19 moving inwardly, the jaw segments opening and all pressure being removed from the piece part 39. The piece part 39 may then be removed from the device.

Figure 3:
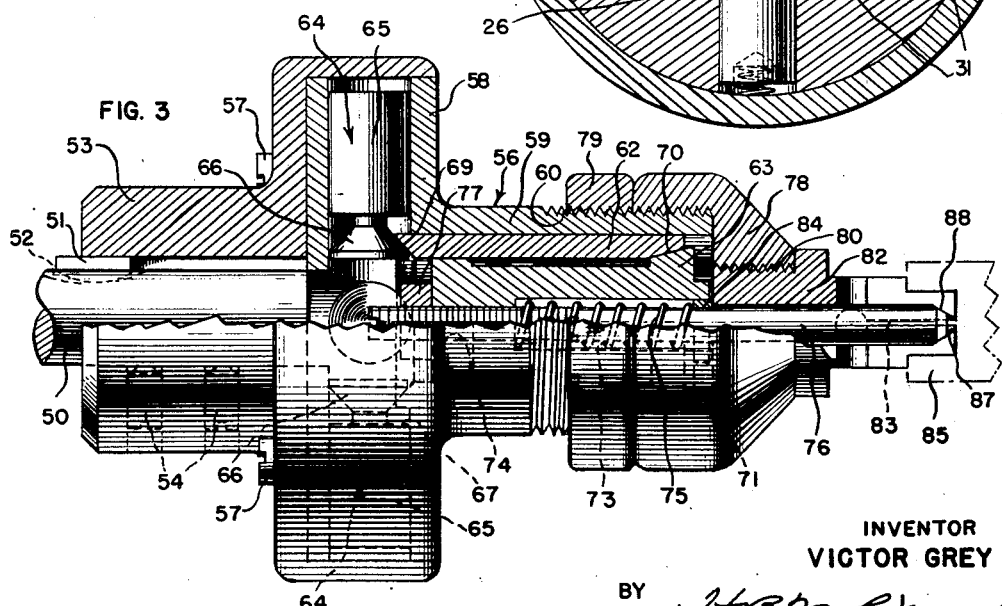
Fig. 3 is a side elevational view, partly in section, of a device featuring a modified form of the present invention.

The following description is of a device featuring a modified form of the present invention:

The modified device as shown in Fig. 3 comprises a rotary shaft 50 which is driven by an electric motor (not shown). Secured to the shaft 50, by means of a key 51 engaging keyway 52 in the shaft, is a flanged collar 53 which is prevented from moving laterally by means of the set screws 54. A housing, generally designated 56 and secured to the flanged collar 53 by means of bolts 57, comprises radial chambers 58 and a laterally extending chamber 59 which is threaded at 60, as shown.

A sleeve 62 is placed within the laterally extending chamber 59 and a collet blank 63 is designed to enter within the sleeve 62. Cylindrically formed centrifugal plungers 64 are disposed within the radial chambers 58, having frusto-conical heads 66 with shoulders 67 formed between the cylindrical portion and the frusto-conical heads.

The frusto-conical heads 66 engage a chamfered surface 69 at the end of the sleeve 62. A chamfer 70, at the front end of the sleeve 62, engages a corresponding surface 71 at the front end of the collet blank 63.

Collet blank 63 has a bore 73 part way through the center, and an inner threaded portion 74, which added together extend the entire length of the collet blank 63. Within the bore 73 there is a spring 75 and a rod 76 which is passed through the spring 75 and threaded within the threaded portion 74 of the collet blank 63. A retainer nut 77 is screwed on the rod 76 abutting the collet blank 63 to hold it in the position in which it has been threaded.

A ring nut 78 having a threaded portion 80, and a lock nut 79 are threaded upon the housing 56 on the aforementioned thread 60, the lock nut 79 acting to limit the amount of movement of the ring nut 78 and to lock it in place.

Threaded within the portion 80 of the ring nut 78 is an arbor 82, the end of which is divided into four segments by slots 83. Placed between the spring 75 and the end of the arbor 82 is a spring follower 84. A piece part 85, upon which work is to be performed, is placed over the segments of the arbor 82. The hollow arbor 82 is formed on the inside of the outer end with a conical surface 87 which is engaged by a corresponding beveled surface 88 at the end of the rod 76.

As the piece part 85 is designed to encompass the segments of the arbor 82, this type of device is known as an expansion chuck.

The operation of the modified device is as follows:

The operator places a piece part 85 upon the segments of the arbor 82 and causes the rotation of the shaft 50 by actuating the electric motor. The rotation of the housing 56 causes the centrifugal plungers 64, due to their weight and centrifugal force, to move outwardly in the radial chambers 58. The radial movement of the centrifugal plungers 64 causes their frusto-conical heads 66 to engage the chamfered surface 69 of the sleeve 62. As the centrifugal plungers 64 move further radially due to increased speed of rotation, the force exerted by their frusto-conical heads 66 will tend to move the sleeve 62 to the right (Fig. 3) which is transmitted through the chamfer 70 to the collet blank 63 by means of the corresponding surface 71 of the collet blank. This force being transmitted to the collet blank 63 tends to move it to the right (Fig. 3), and as the rod 76 is securely fastened within the collet 63 by means of the threaded portion 74, and held at this adjusted position by means of the retainer nut 77, the rod 76 will likewise tend to move to the right.

Any such movement of the rod 76 causes the beveled surface 88 thereon to engage the conical surface 87 forming the inner side of the end of the arbor 82, the resulting pressure exerted tending to cause the segments of the arbor 82 to open up, as they are divided by the slots 83, thus exerting pressure upon the piece part 85. This, of course, tends to hold the piece part 85 firmly in place while the desired work is performed upon it.

When the desired work has been performed, the operator stops the rotation of the shaft 50 by applying the magnetic brake which causes the centrifugal plungers 64, because of the decrease in centrifugal force, to move inwardly. When the centrifugal plungers 64 move toward the junction of the radial chambers 58, the pressure of their frusto-conical heads 66 no longer exerts itself against the chamfered surface 69 of the sleeve 62 thereby terminating the force exerted by the chamfer 70 of the sleeve 62 against the corresponding surface 71 of the collet blank 63. The spring 75, interposed between the end of the bore 73 and the spring follower 84, tends to cause the collet blank 63 to move toward the left (Fig. 3) and withdraw the rod 76 and its beveled surface 88 from engagement with conical surface 87 of the arbor 82. As the pressure of the rod is reduced from the inside of the arbor 82, the resiliency of the material of which the arbor is made will allow the segments to spring back into their normal position, resulting in a decrease of pressure by the segments of the arbor 82 upon the piece part 85. Thus, the operator is able to remove the piece part 85.

By changing the weight of the centrifugal plungers 64 it is possible to vary the amount of force which will be exerted by its frusto-conical head 66 upon the chamfered surface 69 of the sleeve 62. Accordingly, it is possible to regulate the amount of pressure which will be transmitted through the various members to the piece part 85 by the segments of the arbor 82.

Since the rod 76 is threaded into the collet blank 63 and is held in place by the retainer nut 77, it is possible to regulate the length of the rod and therefore to regulate the amount of the beveled surface 88 of the rod which will engage the conical surface 87 of the arbor 82. In this way, it is also possible to regulate the amount of force which will be applied to the arbor 82 and transmitted to the piece part 85 to hold it firmly in place. As some metals are more easily deformed than others, the regulation of the force applied to the piece part is sometimes necessary, depending upon the material of which the piece part is made.

It is to be noted that the arbor 82 is threaded into the ring nut 78, and accordingly, changing the size is a simple operation.

Although specific embodiments of the invention have been shown and described, it will be understood that these are but illustrative and that various modifications may be made without departing from the scope and spirit of this invention.

What is claimed is:

1. In combination with a centrifugal chuck for holding piece parts during rotation, a rotatable shaft, a chuck housing secured to rotate with said shaft affording a longitudinal chamber and a plurality of radial chambers, a plurality of radially reciprocable centrifugally acting plungers each having a camming surface and situated one in each of said radial chambers and free to slide therein, a common thrust member receiving motion from said camming surfaces for transmission in said longitudinal chamber, a jaw unit affording a plurality of chucking segments, and means under the influence of said thrust member for springing said segments to clamp piece parts during centrifugal action of said plungers.

2. In a centrifugal chuck, a housing comprising a laterally extending sleeve and a plurality of radial chambers, a plurality of freely movable radially reciprocable plungers disposed one in each of said radial chambers, a camming surface on said plungers, a thrust ring receiving motion from said camming surfaces, a collet receiving motion from said thrust ring, gripping segments formed on said collet, and means to constrict said gripping segments whereby a piece part is firmly held therein.

3. In combination with a centrifugal chuck for holding piece parts during rotation, a rotatable shaft, a housing secured to rotate with said shaft comprising a laterally extending chamber and a plurality of radial chambers, a plurality of freely movable radially reciprocable centrifugally acting plungers each having a camming surface and situated one in each of said radial chambers, a thrust member receiving motion from said camming surfaces for transmission in said longitudinal chamber, a jaw unit affording a plurality of chucking segments, means under the influence of said thrust members for springing said segments to clamp piece parts during centrifugal action of said plungers, and spring means to urge said plungers out of camming position when said centrifugal action has ceased.

4. In a centrifugal chuck, a housing having a plurality of radial chambers and a laterally extending chamber, a plurality of centrifugal plungers one situated in each of said radial chambers, a sleeve within said laterally extending chamber, a collet blank within said sleeve, an arbor having a bore therein and formed at one end with a plurality of gripping segments, a rod threaded within said collet blank and extending through said bore in said arbor, said arbor being designed to have a piece part placed over said segments thereon, and means to transmit motion from said centrifugal plungers to said arbor whereby said segments will expand and firmly secure a piece part thereon.

5. In combination with a centrifugal chuck for holding piece parts during rotation, a rotatable shaft, a housing secured to rotate with said shaft having a laterally extending chamber and four radial chambers, four freely movable radially reciprocable centrifugal acting plungers each having a camming surface and situated one in each of said radial chambers, a thrust member receiving motion from said camming surfaces for transmission in said longitudinal chamber, a jaw unit affording a plurality of segments, and means under the influence of said thrust member for springing said segments to clamp piece parts during centrifugal action of said plungers.

6. In a centrifugal chuck, a housing having a plurality of radial chambers and a laterally extending chamber, a plurality of centrifugal plungers one situated in each of said radial chambers, a sleeve within said laterally extending chamber, a collet blank within said sleeve, an arbor having a bore therein and formed at one end with a plurality of gripping segments, a rod threaded within said collet blank and extending through said bore in said arbor, said arbor being designed to have a piece part placed over said segments thereon, means to transmit motion from said centrifugal plungers to said arbors whereby said segments will expand and firmly secure a piece part thereon, and means to adjust the position of said rod whereby the pressure exerted on said piece parts may be varied.

VICTOR GREY.